US008676060B2

(12) United States Patent
Kawanishi et al.

(10) Patent No.: US 8,676,060 B2
(45) Date of Patent: Mar. 18, 2014

(54) QUADRATURE AMPLITUDE MODULATION SIGNAL GENERATING DEVICE

(75) Inventors: Tetsuya Kawanishi, Koganei (JP); Takahide Sakamoto, Koganei (JP); Akito Chiba, Koganei (JP); Masahiro Tsuchiya, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 333 days.

(21) Appl. No.: 12/678,491

(22) PCT Filed: Jan. 31, 2008

(86) PCT No.: PCT/JP2008/000124
§ 371 (c)(1),
(2), (4) Date: Mar. 17, 2010

(87) PCT Pub. No.: WO2009/037794
PCT Pub. Date: Mar. 26, 2009

(65) Prior Publication Data
US 2010/0202785 A1 Aug. 12, 2010

(30) Foreign Application Priority Data

Sep. 18, 2007 (JP) ................................. 2007-240478
Nov. 2, 2007 (JP) ................................. 2007-285782

(51) Int. Cl.
*H04B 10/00* (2013.01)
(52) U.S. Cl.
USPC ........................................ 398/186; 398/183
(58) Field of Classification Search
USPC ................................................ 398/182–201
See application file for complete search history.

(56) References Cited

U.S. PATENT DOCUMENTS

| 4,464,767 A | 8/1984 | Bremer |
| 6,278,539 B1 * | 8/2001 | Ooi et al. ...................... 359/237 |
| 6,341,031 B1 * | 1/2002 | McBrien et al. ............... 359/237 |
| 6,900,707 B2 * | 5/2005 | Erlig et al. ..................... 333/156 |
| 7,224,506 B2 * | 5/2007 | Kim et al. ..................... 359/276 |

(Continued)

FOREIGN PATENT DOCUMENTS

| JP | 6-90263 A | 3/1994 |
| JP | 9-200278 A | 7/1997 |

(Continued)

OTHER PUBLICATIONS

English translation of an International Preliminary Report on Patentability (IPRP) issued Apr. 7, 2010, by the International Bureau of WIPO in International Application No. PCT/JP2008/000124 (8 pages).

(Continued)

*Primary Examiner* — Agustin Bello
(74) *Attorney, Agent, or Firm* — Osha Liang LLP

(57) ABSTRACT

A quadrature amplitude modulation (QAM) signal generator, which can obtain optical signals such as QAM signals without handling multilevel electrical signals, can be produced by using a plurality of parallel Mach-Zehnder modulators (MZMs), such as quadruplex parallel MZMs (QPMZM). The quadrature amplitude modulation (QAM) signal generator includes a first waveguide, a first quadrature phase-shift-keying (QPSK) signal generator provided on the first waveguide, a second waveguide connected with the first waveguide at a wave-combining point, and a second quadrature phase-shift-keying (QPSK) signal generator provided on the second waveguide.

4 Claims, 9 Drawing Sheets

(56) References Cited

U.S. PATENT DOCUMENTS

| | | | |
|---|---|---|---|
| 7,239,763 B2* | 7/2007 | Kawanishi et al. | 385/1 |
| 7,245,787 B2* | 7/2007 | Kawanishi et al. | 385/1 |
| 7,266,306 B1* | 9/2007 | Harley et al. | 398/182 |
| 7,302,120 B2* | 11/2007 | Sakane et al. | 385/3 |
| 7,421,209 B2* | 9/2008 | Kawanishi et al. | 398/183 |
| 7,636,501 B2* | 12/2009 | Doerr et al. | 385/3 |
| 7,676,161 B2* | 3/2010 | Roberts et al. | 398/194 |
| 7,689,067 B2* | 3/2010 | Ichikawa et al. | 385/3 |
| 7,711,215 B2* | 5/2010 | Kawanishi et al. | 385/3 |
| 7,751,724 B2* | 7/2010 | Hashimoto et al. | 398/183 |
| 7,826,752 B1* | 11/2010 | Zanoni et al. | 398/205 |
| 7,869,668 B2* | 1/2011 | Hashimoto et al. | 385/1 |
| 7,899,338 B2* | 3/2011 | Hashimoto et al. | 398/198 |
| 7,929,813 B2* | 4/2011 | Doerr et al. | 385/3 |
| 7,953,303 B2* | 5/2011 | Gheorma et al. | 385/3 |
| 7,957,653 B2* | 6/2011 | Kawanishi et al. | 398/188 |
| 8,050,351 B2* | 11/2011 | Cho et al. | 375/295 |
| 8,090,226 B2* | 1/2012 | Mori et al. | 385/2 |
| 8,170,422 B2* | 5/2012 | Kawanishi et al. | 398/161 |
| 8,184,355 B2* | 5/2012 | Tsunoda et al. | 359/279 |
| 2002/0080454 A1* | 6/2002 | Schemmann et al. | 359/181 |
| 2005/0175357 A1* | 8/2005 | Kawanishi et al. | 398/187 |
| 2006/0127102 A1* | 6/2006 | Roberts et al. | 398/182 |
| 2007/0019968 A1* | 1/2007 | Hashimoto et al. | 398/198 |
| 2007/0122161 A1* | 5/2007 | Charlet et al. | 398/188 |
| 2007/0133918 A1* | 6/2007 | Cho et al. | 385/1 |
| 2007/0212075 A1* | 9/2007 | Yin | 398/183 |
| 2007/0292142 A1* | 12/2007 | Hashimoto et al. | 398/186 |
| 2010/0202785 A1* | 8/2010 | Kawanishi et al. | 398/185 |
| 2011/0129230 A1* | 6/2011 | Zanoni et al. | 398/140 |

FOREIGN PATENT DOCUMENTS

| | | |
|---|---|---|
| JP | 2003-515976 A | 5/2003 |
| JP | 2004-172829 A | 6/2004 |
| JP | 2005-309447 A | 11/2005 |
| WO | 2005/091532 A1 | 9/2005 |

OTHER PUBLICATIONS

International Search Report w/translation from PCT/JP2008/000124 dated Mar. 18, 2008 (4 pages).

* cited by examiner

QUADRATURE AMPLITUDE MODULATION SIGNAL GENERATING DEVICE

BACKGROUND OF THE INVENTION

1. Field of the Invention

The present invention relates to a quadrature amplitude modulation (QAM) signal generator.

2. Description of the Related Arts

Various multilevel optical modulation formats such as DQPSK (Differential-Quadrature Phase-Shift-Keying), QPSK (Quadrature Phase-Shift-Keying) in a coherent detecting system, APSK (Amplitude-and-Phase-Shift-Keying), and QAM (Quadrature-Amplitude-Modulation) have been developed for the purpose of improving the frequency utilization efficiency of channels for optical communications.

Especially, DQPSK using dual parallel Mach-Zehnder modulators (DPMZM) is the most practicable and has received particular attention, since it can modulate the in-phase components (I components) of a carrier signal and the quadrature phase components (Q components) of the carrier signal independently by using the modulators. There has been developed a DQPSK signal generator that can generate an optical modulation signal over 100 Gb/s owing to two high-speed binary data signal systems having a modulation speed of 50 Gbaud or more.

The QAM scheme has higher spectral efficiency compared to the QPSK scheme. Employing DQPSK using the above-described DPMZM can improve the performance of the QAM scheme. However, such technology has a problem that it is not easy to handle multilevel electrical signals.

Input binary data streams are conventionally used by converting them into multilevel electrical signals. At present, high-speed arbitrary waveform shaping devices are generally used for that purpose. For electrical circuits, nonlinearity is being suppressed, and the circuit frequency response is being designed carefully. For such reasons, the rate of QAM signals is only a few Gbaud or less.

Therefore, there has been needed a device which can obtain optical signals such as QAM signals without handling multilevel electrical signals, and a method therefor.

REFERENCE

T. Kawanishi et al., Optics Express., vol. 14, pages 4469-4478 (2006)

An object of the present invention is to provide a quadrature amplitude modulation signal generator which can obtain optical signals such as QAM signals without handling multilevel electrical signals.

SUMMARY OF THE INVENTION

The present invention is based on knowledge that a quadrature amplitude modulation signal generator which can obtain an optical signal such as QAM signals without handling multilevel electrical signals can be provided by using a plurality of parallel Mach-Zehnder modulators (MZMs) such as quadruplex parallel MZMs (QPMZM).

Specifically, various aspects of the present invention are as follows.

The first aspect of the present invention relates to a quadrature amplitude modulation (QAM) signal generator. The quadrature amplitude modulation (QAM) signal generator comprises a first quadrature phase-shift-keying (QPSK) signal generator (3) and a second QPSK signal generator (6). The first quadrature phase-shift-keying (QPSK) signal generator (3) is provided on a first waveguide (2). The second QPSK signal generator (6) is provided on a second waveguide (5). The first waveguide (2) and the second waveguide (5) are connected to each other at an wave-combining point (4).

As will be demonstrated in the examples included herein, QAM signals can be obtained by employing the above-described configuration.

The QAM signal generator according to the first aspect of the present invention comprises the first QPSK signal generator (3) and the second QPSK signal generator (6). The QPSK signal generators (3, 6) preferably have a plurality of Mach-Zehnder waveguides. The QPSK signal generators (3, 6) have, for example, a main Mach-Zehnder waveguide (7a, 7b) that has a first arm and a second arm. The main Mach-Zehnder waveguide (7a, 7b) may be provided with sub Mach-Zehnder waveguides (8a, 9a, 8b, 9b) on the two arms.

The QAM signal generator according to the first aspect of the present invention is preferably provided with an amplitude adjusting mechanism (amplitude adjusting means) for performing adjustments so that the amplitude of the output signal from the second QPSK signal generator (6) becomes smaller than the amplitude of the output signal from the first QPSK signal generator. Such amplitude adjusting mechanism includes a controller and a power source connected to the controller. A voltage signal output from the power source is applied to an electrode of the QAM signal generator, thereby adjusting the amplitude.

The QAM signal generator according to the first aspect of the present invention is preferably provided with an amplitude adjusting mechanism (amplitude adjusting means) for performing adjustments so that the amplitude of the output signal from the second QPSK signal generator (6) becomes half the amplitude of the output signal from the first QPSK signal generator (3).

The QAM signal generator according to the first aspect of the present invention comprises the first QPSK signal generator (3) and the second QPSK signal generator (6). The QPSK signal generators (3, 6) have, for example, a main Mach-Zehnder waveguide (7a, 7b) that has a first arm and a second arm. The main Mach-Zehnder waveguide (7a, 7b) are, for example, provided with sub Mach-Zehnder waveguides (8a, 9a, 8b, 9b) on the two arms. The QAM signal generator according to the first aspect of the present invention is preferably provided with a first bias electrode (10a, 10b), a second bias electrode (11a, 11b) and a third bias electrode (13a, 13b). The first bias electrode (10a, 10b) adjusts the bias voltage to be applied to the first arm of the main Mach-Zehnder waveguide. The second bias electrode (11a, 11b) adjusts the bias voltage to be applied to the second arm of the main Mach-Zehnder waveguide. The third bias electrode (13a, 13b) applies the bias voltage to the first arm and the second arm through which signals to be combined at an wave-combining part (12a, 12b) of the main Mach-Zehnder waveguide (7a, 7b) propagate.

The QAM signal generator according to the first aspect of the present invention comprises the first QPSK signal generator (3) and the second QPSK signal generator (6). In the QAM signal generator according to the first aspect of the present invention, the QPSK signal generators (3, 6) are preferably provided on a $LiNbO_3$ waveguide (21). In addition, the wave-combining point (4) located between the first waveguide (2) and the second waveguide (5) is preferably provided on a planar lightwave circuit (PLC) (22). The planar lightwave circuit (PLC) (22) is preferably optically connected to the $LiNbO_3$ waveguide (21). The QAM signal generator according to the first aspect of the present invention may combine the above-described configurations as appropriate.

A QAM signal generating method according to the second aspect of the present invention basically corresponds to a QAM signal generating method using any one of the above-described QAM signal generators. Specifically, the QAM signal generating method according to the second aspect of the present invention comprises a step of combining an output signal from the first QPSK signal generator and an output signal from the second QPSK signal generator (6) with each other. The output signal from the second QPSK signal generator (6) is preferably half the amplitude of the output signal from the first QPSK signal generator.

In the QAM signal generating method according to the second aspect of the present invention, the phase difference between the signals propagating through the two arms, before being combined with each other in the four sub Mach-Zehnder waveguides (8a, 9a, 8b, 9b), is adjusted to be 0° or 180°. This adjustment can be performed by controlling the bias electrodes. Then, the phase difference between the signals propagating through the first arm and the second arm, before being combined with each other in each of the main Mach-Zehnder waveguides (7a, 7b), is adjusted to be 90° or 270°. This adjustment can be performed by controlling the bias electrodes. Following this, the first QPSK signal generator (3) and the second QPSK signal generator (6) adjust the phase difference between the signals propagating through the first waveguide (2) and the second waveguide (5), before being combined with each other at the wave-combining point (4), to be 0° or 180°. This adjustment can be performed by controlling the bias electrodes. The QAM signal generating method (particularly for optical QAM signals) can be thus attained or obtained.

Another embodiment of the QAM signal generating method according to the second aspect of the present invention is different from the above-described embodiment in that it includes a step of combining a first quadruple amplitude-shift-keying (ASK) signal and a second ASK signal with each other. In this method the first ASK signal is generated in the first main Mach-Zehnder waveguide (7a), while the second ASK signal is generated in the second main Mach-Zehnder waveguide (7b). QAM signals can be obtained by combining these two kind of signals with each other under the condition that the second ASK signal has a phase difference of 90° with respect to the first ASK signal.

In the QAM signal generating method according to the second aspect of the present invention, the second QPSK signal generator preferably outputs a signal having smaller amplitude than the output signal from the first QPSK signal generator.

The QAM signal generating method according to the second aspect of the present invention is preferably a method for generating QAM signals according to the following steps. Firstly, the phase difference between the signals propagating through the first arm and the second arm before being combined with each other in the four sub Mach-Zehnder waveguides (8a, 9a, 8b, 9b) is adjusted to be 180°. This adjustment can be performed by controlling the bias electrodes. Secondly, each of the main Mach-Zehnder waveguides (7a, 7b) allows the phase difference between the signals propagating through the first arm and the second arm before being combined with each other to be adjusted to be 0° or 180°. This adjustment can be performed by controlling the bias electrodes. Thirdly, each of the first QPSK signal generator (3) and the second QPSK signal generator (6) allow the phase difference between the signals propagating through the first waveguide (2) and the second waveguide (5) before being combined with each other at the wave-combining point (4) to be adjusted to be 90° or 270°. This adjustment can be performed by controlling the bias electrodes.

The third aspect of the present invention relates to a quadrature amplitude modulation (QAM) signal generator. The quadrature amplitude modulation (QAM) signal generator comprises a first quadrature phase-shift keying (QPSK) signal generator (53), a second QPSK signal generator (56), and a third QPSK signal generator (59). With the exception of an increased number of QPSK signal generators, the configurations used in the QAM signal generator according to the first aspect of the present invention can be employed in this aspect as appropriate.

In the QAM signal generator according to the third aspect of the present invention, the first quadrature phase-shift keying (QPSK) signal generator (53) is provided on a first waveguide (52), the second QPSK signal generator (56) is provided on a second waveguide (55), and the third QPSK signal generator (59) is provided on a third waveguide (58). The second waveguide (55) is connected with the first waveguide (53) at an wave-combining point (54). The third waveguide (58) is connected with the second waveguide (55) at an wave-combining point (57). The third QPSK signal generator (59) preferably outputs a signal having smaller amplitude than the output signal from the second QPSK signal generator.

In the QAM signal generator according to the third aspect of the present invention, the amplitude of the output signal from the second QPSK signal generator is preferably half the amplitude of the output signal from the first QPSK signal generator. In the QAM signal generator according to the third aspect of the present invention, the amplitude of the output signal from the third QPSK signal generator is preferably half the amplitude of the output signal from the second QPSK signal generator. The QAM signal generator according to the third aspect of the present invention preferably has an amplitude adjusting mechanism (amplitude adjusting means) and can adjust the amplitude of the output signal using the amplitude adjusting mechanism.

The QAM signal generator according to the fourth aspect of the present invention relates to a QAM signal generator with a testing function. With respect to its basic configurations, the configurations or elements of the above-described QAM signal generators can be employed in this aspect as appropriate.

The QAM signal generator according to the fourth aspect of the present invention comprises a test signal inputting device, an optical detector, and an automatic bias adjusting device. The test signal inputting device inputs a test signal to each bias electrode. The optical detector detects an output signal from a waveguide to which the test signal input by the test signal inputting device. The automatic bias adjusting device adjusts the bias voltage to be applied to each of the electrodes. Detection data from the optical detector is input to the automatic bias adjusting device. When an output spectrum detected by the optical detector includes two sideband components, the bias voltage is adjusted so that the double component of the modulation signal is reduced.

In the QAM signal generator according to the fourth aspect of the present invention, the frequency of the test signal is preferably 10 kHz or less. The test signal to be input to each of the bias electrodes is preferably a signal having a phase difference of approximately 90° or 270°.

A signal generator according to the fifth aspect of the present invention comprises a plurality of parallel signal generators and an wave-combining part at which the outputs from the plurality of signal generators are combined with each other. The signal generators appropriately have the configurations or elements of the above-described QAM signal generators.

A QAM signal generator according to the sixth aspect of the present invention comprises four or more QPSK signal generators. The configurations or elements of the above-described QAM signal generators can be employed in this aspect, except that it has four or more QPSK signal generators.

The QAM signal generator according to the sixth aspect of the present invention comprises "an nth waveguide having an wave-combining point with respect to an (n−1)th waveguide and an nth QPSK signal generator provided on the nth waveguide, for outputting a signal to be combined with an output signal from the (n−1)th QPSK signal generator."

The QAM signal generator according to the sixth aspect of the present invention relates to a signal generator comprising a first waveguide (2), a first quadrature phase-shift-keying (QPSK) signal generator (3) provided on the first waveguide (2), a second waveguide (5) being connected with the first waveguide (2) at an wave-combining point (4), and a second QPSK signal generator (6) which is provided on the second waveguide (5) and outputs a signal to be combined with the output signal from the first QPSK signal generator. It can therefore appropriately generate signals other than QAM signals. This signal generator can also employ the configurations or elements of the above-described QAM signal generators as appropriate.

A signal generator according to the seventh aspect of the present invention relates to a signal generator comprising a first waveguide (52), a first quadrature phase-shift keying (QPSK) signal generator (53) provided on the first waveguide (52), a second waveguide (55) being connected with the first waveguide (53) at an wave-combining point (54), a second QPSK signal generator (56) which is provided on the second waveguide (55) and outputs a signal to be combined with the output signal from the first QPSK signal generator, a third waveguide (58) being connected with the second waveguide (55) at an wave-combining point (57), and a third QPSK signal generator (59) which is provided on the third waveguide (58) and outputs a signal to be combined with the output signal from the second QPSK signal generator. It can therefore appropriately generate signals other than QAM signals. The configurations or elements of the above-described QAM signal generators can also be employed in this signal generator as appropriate.

A signal generating method according to the eighth aspect of the present invention basically relates to a technique which can partially eliminate or omit bias electrodes to be provided for controlling bias voltage. In this aspect, the above-described signal generators can be used as a QAM signal generator as appropriate. And yet, the QAM signal generator for use in the signal generating method according to the eighth aspect of the present invention can eliminate bias electrodes as appropriate. The above-described steps can be employed in this aspect as appropriate to obtain QAM signals.

The QAM signal generator for use in the signal generating method according to the eighth aspect of the present invention is, for example, as follows. A QAM signal generator comprises a first waveguide (2), a first quadrature phase-shift-keying (QPSK) signal generator (3) provided on the first waveguide (2), a second waveguide (5) being connected with the first waveguide (2) at an wave-combining point (4), and a second QPSK signal generator (6) which is provided on the second waveguide (5) and outputs a signal having smaller amplitude than the output signal from the first QPSK signal generator. The first QPSK signal generator (3) and the second QPSK signal generator (6) have a main Mach-Zehnder waveguide (7a, 7b) that has a first arm and a second arm. The first QPSK signal generator (3) and the second QPSK signal generator (6) have the two sub Mach-Zehnder waveguides (8a, 9a, 8b, 9b), which are provided on the first arm and the second arm of the main Mach-Zehnder waveguide (7a, 7b). The main Mach-Zehnder waveguide (7a) of the first QPSK signal generator (3) and the main Mach-Zehnder waveguide (7b) of the second QPSK signal generator (6) comprise at least one of the first bias electrode (10a, 10b) for adjusting the bias voltage to be applied to the first arm of the main Mach-Zehnder waveguide, the second bias electrode (11a, 11b) for adjusting the bias voltage to be applied to the second arm of the main Mach-Zehnder waveguide, and the third bias electrode (13a, 13b) for applying the bias voltage to the first arm and the second arm through which signals to be combined at an wave-combining part (12a, 12b) of the main Mach-Zehnder waveguide (7a, 7b).

In the signal generating method according to the eighth aspect of the present invention, the phase difference between the signals propagating through the first arm and the second arm before being combined with each other in the four sub Mach-Zehnder waveguides (8a, 9a, 8b, 9b) is adjusted to be 180°. Secondly, the phase difference between the signals propagating through the first arm and the second arm before being combined with each other in the main Mach-Zehnder waveguide (7a, 7b) is adjusted to be 90° or 270°. Thirdly, the first QPSK signal generator (3) and the second QPSK signal generator (6) allow the phase difference between the signals propagating through the first waveguide (2) and the second waveguide (5) before being combined with each other at the wave-combining point (4) to be 0° or 180°. Such adjustments can be performed by controlling the bias voltage to be applied to each bias electrode. The output signal from the first QPSK signal generator and the output signal from the second QPSK signal generator (6), of which the amplitude is half that of the output signal from the first QPSK signal generator, are then combined with each other, thereby generating QAM signals.

Another embodiment of the signal generating method according to the eighth aspect of the present invention, but which is different from the above-described embodiment, relates to a quadrature amplitude modulation (QAM) signal generating method using a quadrature amplitude modulation (QAM) signal generator. The QAM signal generator comprises a first waveguide (2), a first quadrature phase-shift-keying (QPSK) signal generator (3) provided on the first waveguide (2), a second waveguide (5) being connected with at the first waveguide (2) an wave-combining point (4), and a second QPSK signal generator (6) provided on the second waveguide (5). The first QPSK signal generator (3) and the second QPSK signal generator (6) have a main Mach-Zehnder waveguide (7a, 7b) that has a first arm and a second arm. The first QPSK signal generator (3) and the second QPSK signal generator (6) have two sub Mach-Zehnder waveguides (8a, 9a, 8b, 9b), which are provided on the first arm and the second arm of the main Mach-Zehnder waveguide (7a, 7b). The main Mach-Zehnder waveguide (7a) of the first QPSK signal generator (3) and the main Mach-Zehnder waveguide (7b) of the second QPSK signal generator (6) comprise at least one of a first bias electrode (10a, 10b) for adjusting the bias voltage to be applied to the first arm of the main Mach-Zehnder waveguide, a second bias electrode (11a, 11b) for adjusting the bias voltage to be applied to the second arm of the main Mach-Zehnder waveguide, and a third bias electrode (13a, 13b) for applying a bias voltage to the first arm and the second arm through which signals to be combined at an wave-combining part (12a, 12b) of the main Mach-Zehnder waveguide (7a, 7b) propagate. The QAM signal generating method includes a step of controlling the bias signals to be applied to the first bias electrode (10a, 10b), the second bias electrode (11a, 11b), and the third bias electrode (13a, 13b) so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be (45+90m)°, where m is an integer, and so that the first QPSK signal generator (3) and the second QPSK signal generator (6) allow the phase difference between the signals propagating through the first waveguide (2) and the second waveguide (5) before being combined with each other at the wave-combining point (4) to be 0° or 180°, and a step of combining the output signal from the first QPSK signal generator and the output signal from the second QPSK signal generator (6) with each other.

Another embodiment of the signal generating method according to the eighth aspect of the present invention, but which is different from the above-described embodiments, relates to a quadrature amplitude modulation (QAM) signal generating method using a quadrature amplitude modulation (QAM) signal generator. The QAM signal generator comprises a first waveguide (2), a first quadrature phase-shift-keying (QPSK) signal generator (3) provided on the first waveguide (2), a second waveguide (5) being connected with the first waveguide (2) at an wave-combining point (4), and a second QPSK signal generator (6) provided on the second waveguide (5). The first QPSK signal generator (3) and the second QPSK signal generator (6) have a main Mach-Zehnder waveguide (7a, 7b) that has a first arm and a second arm. The first QPSK signal generator (3) and the second QPSK signal generator (6) have two sub Mach-Zehnder waveguides (8a, 9a, 8b, 9b), which are provided on the first arm and the second arm of the main Mach-Zehnder waveguide (7a, 7b). The main Mach-Zehnder waveguide (7a) of the first QPSK signal generator (3) and the main Mach-Zehnder waveguide (7b) of the second QPSK signal generator (6) comprise at least one of a first bias electrode (10a, 10b) for adjusting the bias voltage to be applied to the first arm of the main Mach-Zehnder waveguide, a second bias electrode (11a, 11b) for adjusting the bias voltage to be applied to the second arm of the main Mach-Zehnder waveguide, and a third bias electrode (13a, 13b) for applying a bias voltage to the two arms through which signals to be combined at an wave-combining part (12a, 12b) of the main Mach-Zehnder waveguide (7a, 7b) propagate The QAM signal generating method includes a step of controlling the bias signals to be applied to the first bias electrode (10a, 10b), the second bias electrode (11a, 11b), and the third bias electrode (13a, 13b) so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be (30+90l)°, where l is an integer, and so that the first QPSK signal generator (3) and the second QPSK signal generator (6) allow the phase difference between the signals propagating through the first waveguide (2) and the second waveguide (5) before being combined with each other at the wave-combining point (4) to be 0° or 180°, and for combining the output signal from the first QPSK signal generator and the output signal from the second QPSK signal generator (6) with each other.

Another embodiment of the signal generating method according to the eighth aspect of the present invention, but which is different from the above-described embodiments, relates to a QPSK signal generator. The QPSK signal generator comprises a main Mach-Zehnder waveguide (7a, 7b) that having a first arm and a second arm, and two sub Mach-Zehnder waveguides (8a, 9a, 8b, 9b), which are provided on the first arm and the second arm of the main Mach-Zehnder waveguide (7a, 7b). The QPSK signal generator comprises a test signal inputting device for inputting a test signal to the bias electrode of one of the main Mach-Zehnder waveguides, or one or both of the bias electrodes of the two sub Mach-Zehnder waveguides, an optical detector for detecting an output signal from a waveguide to which the test signal has been input from the test signal inputting device, and an automatic bias adjusting device which uses detection data from the optical detector and adjusts the bias voltage so that when an output spectrum detected by the optical detector includes two sideband components, the double component of the modulation frequency is reduced.

In the signal generating method according to the eighth aspect of the present invention, the frequency of the test signal is preferably 10 kHz or less. Furthermore, in the signal generating method according to the eighth aspect of the present invention, two test signals are preferably input to the two sub Mach-Zehnder waveguides, wherein the two test signals have a phase difference of approximately 90° or 270°.

According to the present invention, a quadrature amplitude modulation signal generator which can obtain optical signals such as QAM signals without handling multilevel electrical signals can be provided.

BRIEF DESCRIPTION OF THE DRAWINGS

FIG. 8(a) and FIG. 8(b) show that large-amplitude and small-amplitude QPSK signals, respectively, have been generated.

DESCRIPTION OF THE PREFERRED EMBODIMENTS

Figure 1:
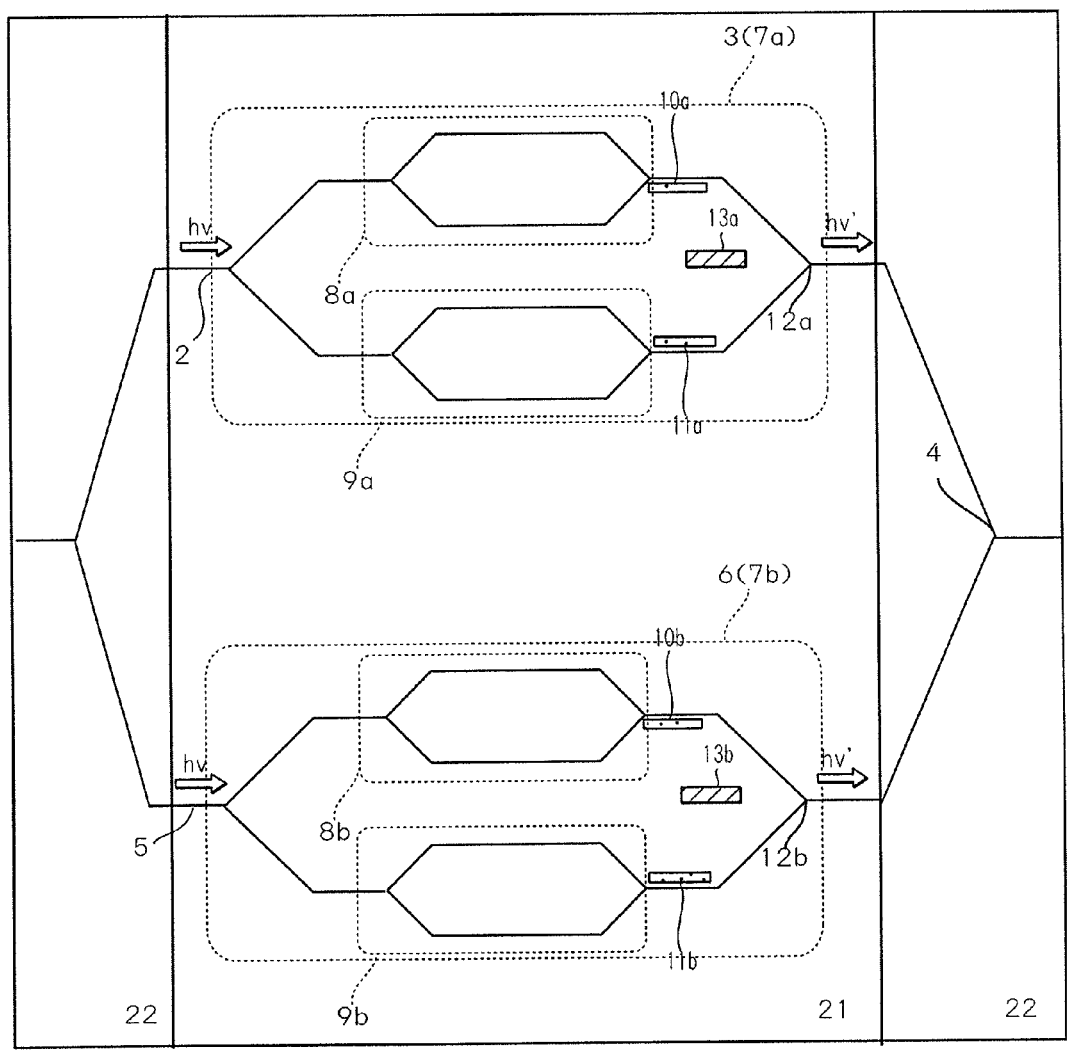
FIG. 1 is a schematic diagram showing a quadrature amplitude modulation signal generator of the present invention.

Hereinafter, the present invention will be explained in detail referring to figures. FIG. 1 is a schematic diagram showing a quadrature amplitude modulation (QAM) signal generator of the present invention. As shown in FIG. 1, the QAM signal generator of the present invention comprises a first waveguide (2), a first quadrature phase-shift-keying (QPSK) signal generator (3) provided on the first waveguide (2), a second waveguide (5) being connected with the first waveguide (2) at an wave-combining point (4), and a second QPSK signal generator (6) provided on the second waveguide (5). The QAM signal generator preferably allows light to diverge from one input path to the first waveguide (2) and the second waveguide (5).

Figure 2:
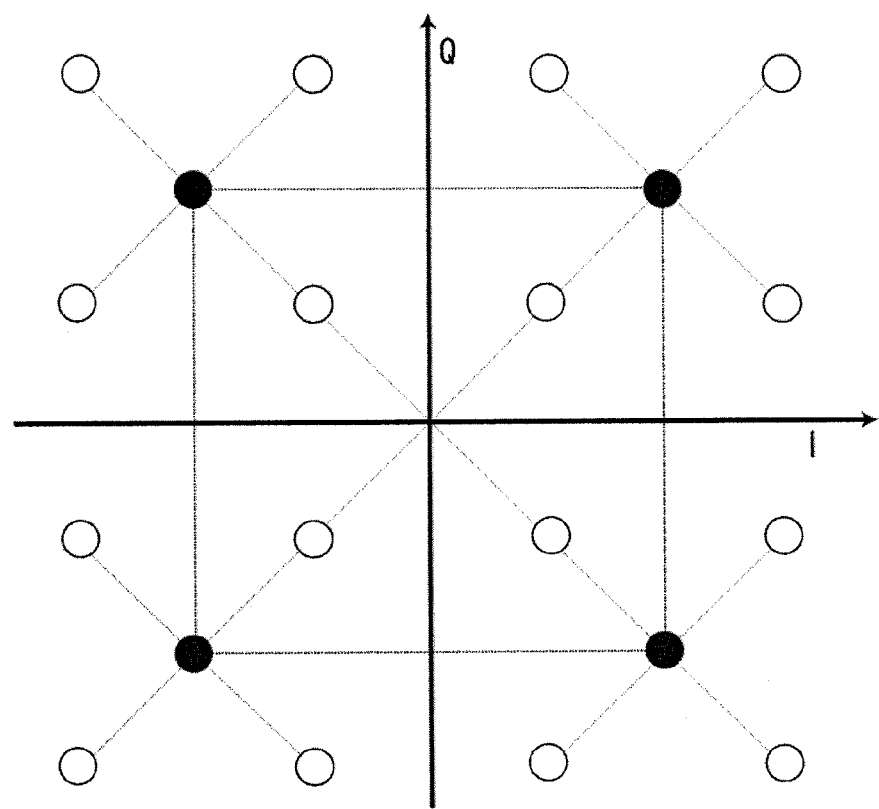
FIG. 2 is a diagram illustrating a quadrature amplitude modulation signal.

In the present invention, basically, a quadrant in which each of QAM signals appears (a quadrant which is the area between the axes shown in FIG. 2) is determined by a large-amplitude QPSK signal, and the position in the quadrant is determined by a small-amplitude QPSK signal. In other words, the position of each of the black spots shown in FIG. 2 is determined by the large-amplitude QPSK signal, while the position of each of the white spots (the position of each of the QAM signals) is determined by the small-amplitude QPSK signal. In the meanwhile, each QPSK signal can be obtained without multilevel electrical signals. According to the present invention, therefore, QAM signals can be obtained.

A waveguide is a path through which a light signal propagates. The waveguide may be a Ti-diffused waveguide provided on a $LiNbO_3$ substrate (this waveguide is also referred to as "a $LiNbO_3$-based waveguide").

As shown in FIG. 1, each of the first QPSK signal generator (3) and the second QPSK signal generator (6) has the main Mach-Zehnder waveguide (7a, 7b). The main Mach-Zehnder waveguide (7a, 7b) has a first arm and a second arm (these are referred to as "the two arms"). The two arms of the main Mach-Zehnder waveguide (7a, 7b) are provided with two sub Mach-Zehnder waveguides (8a, 9a, 8b, 9b). The configuration of this QPSK signal generator is known as an optical SSB (Single Side-Band) modulator, an optical FSK signal generator, or the like. This QPSK signal generator can also therefore utilize known methods as appropriate. For the optical SSB (Single Side-Band) modulator, see, for example, Japanese Patent Application Laid-Open Publication No. 2005-274806. For the optical FSK signal generator, which is an improved version of the optical SSB modulator, see, for example, Japanese Patent Application Laid-Open Publication Nos. 2007-086207, 2007-057785, and 2005-134897. These documents are incorporated herein by reference.

The second QPSK signal generator (6) preferably outputs a signal having smaller amplitude than the output signal from the first QPSK signal generator. The amplitude of the output signal from the second QPSK signal generator (6) is preferably adjusted to be half the amplitude of the output signal from the first QPSK signal generator. By doing so, equally-spaced QAM signals can be obtained. The half amplitude does not strictly mean half value, and the value which can be substantially discriminated as QAM signals may be employed. Specifically, the amplitude of the output signal from the second QPSK signal generator (6) may be in between 30% and 70%, between 40% and 60%, or between 45% and 55% of the amplitude of the output signal from the first QPSK signal generator. The adjustment of the signals can by achieved by, for example, an amplitude adjusting mechanism. The amplitude adjusting mechanism is specifically achieved by a voltage control means for controlling the voltage to be applied to a bias electrode(s), or the like. An intensity modulator may be provided on a waveguide(s) as appropriate in order to adjust the amplitude by performing predetermined intensity modulation using the intensity modulator.

Meanwhile, when the phase difference of the QPSK signals or quadruple ASK signals described later is 45° (precisely 45°+90n° (where n is an integer) and the same applies to the following) or is other than an integral multiple of 90°, such as 30°, 22.5°, 18°, or 15°, the second QPSK signal generator (6) may output a signal having the same amplitude as the output signal from the first QPSK signal generator. Hereinafter, a case in which the phase difference of the QPSK signals is 0°, 90°, 180°, or 270° and a case in which the phase difference of the quadruple ASK signals is 90° or 270° will be described. Even when the phase difference of the QPSK signals or the quadruple ASK signals is other than those, an adjustment can be similarly achieved.

In order to make or adjust the amplitude of the output signal from the second QPSK signal generator (6) smaller than the amplitude of the output signal from the first QPSK signal generator, the second QPSK signal generator may be combined with, for example, an attenuator or an intensity modulator, thereby driving it with smaller amplitude. When the attenuator or the like is not used, for example, the intensity diverging ratio of the waveguides may be set to be asymmetric. For example, when an optical signal is propagated from an input port via a diverging point to the first waveguide (2) and the second waveguide (5), the diverging ratio may be set to be 4:1. Such an adjustment in the diverging ratio is known and can be easily achieved by adjusting a coupler and waveguides.

A preferred embodiment of the present invention includes any one of the devices described above, wherein the main Mach-Zehnder waveguide (7a) of the first QPSK signal generator (3) and the main Mach-Zehnder waveguide (7b) of the second QPSK signal generator (6) may have three bias electrodes. A first bias electrode (10a, 10b) of the three bias electrodes is an electrode for adjusting the bias voltage to be applied to a first arm of the two arms constituting the main Mach-Zehnder waveguide. A second bias electrode (11a, 11b) is an electrode for adjusting the bias voltage to be applied to a second arm of the two arms constituting the main Mach-Zehnder waveguide. A third bias electrode (13a, 13b) is an electrode for applying a bias voltage to signals propagating through the first arm and the second arm to be combined at an wave-combining part (12a, 12b) of the main Mach-Zehnder waveguide (7a, 7b).

By thus providing many bias electrodes with any one of the devices, the phase difference of the signals propagating through the arms is effectively adjusted, thereby achieving QAM signals with various forms.

A preferred embodiment of the present invention includes any one of the devices described above, wherein the first QPSK signal generator (3) and the second QPSK signal generator (6) are provided on a $LiNbO_3$ waveguide (21), and the wave-combining point (4) between the first waveguide (2) and the second waveguide (5) is provided on a planar light-wave circuit (PLC) (22), which is optically connected with the $LiNbO_3$ waveguide (21). By thus performing hybrid integration of a substrate such as a $LiNbO_3$ substrate and a PLC, a signal generator including a plurality of MZMs (Mach-Zehnder modulators) can be manufactured relatively easily. A PLC manufacturing method is disclosed in Japanese Patent Application Laid-Open Publication No. 2006-195036.

The QAM signal generator of the present invention can thus be manufactured by combining the technique of the optical SSB modulator, the optical FSK signal generator, or the like and the technique of the PLC or the like, with ordinary technical knowledge possessed by one of the persons skilled in the art.

Using the above-described QAM signal generators, QAM signals can by obtained. The specific QAM signal generating method is a QAM signal generating method using the quadrature amplitude modulation (QAM) signal generator comprising the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) which is provided on the second waveguide (5) and outputs a signal having smaller amplitude than the output signal from the first QPSK signal generator, wherein the first QPSK signal generator (3) and the second QPSK signal generator (6) comprise the main Mach-Zehnder waveguide (7a, 7b), and two sub Mach-Zehnder waveguides (8a, 9a, 8b, 9b), which are provided on the first arm and the second arm of the main Mach-Zehnder waveguide (7a, 7b), and wherein the method includes a step of combining an output signal from the first QPSK signal generator with the output signal from the second QPSK signal generator (6), of which the amplitude is half that of the output signal from the first QPSK signal generator.

A preferred embodiment of the QAM signal generating method is a method, wherein the main Mach-Zehnder waveguide (7a) of the first QPSK signal generator (3) and the main Mach-Zehnder waveguide (7b) of the second QPSK signal generator (6) comprise the first bias electrode (10a, 10b) and the second bias electrode (11a, 11b) for adjusting the bias voltage to be applied to the first arm and the second arms constituting the main Mach-Zehnder waveguide, and the third bias electrode (13a, 13b) for applying the bias voltage to the first arm and the second arms through which signals to be combined at the wave-combining part (12a, 12b) of the main Mach-Zehnder waveguide (7a, 7b), and wherein the bias signals to be applied to the first bias electrode (10a, 10b), the second bias electrode (11a, 11b), and the third bias electrode (13a, 13b) are controlled so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be 90° or 270°, and so that the first QPSK signal generator (3) and the second QPSK signal generator (6) allow the phase difference between the signals propagating through the first waveguide (2) and the second waveguide (5) before being combined with each other at the wave-combining point (4) to be 0°, 90°, 180°, or 270°. The control of the phase difference is known as, for example, the optical SSB modulation technique, the optical FSK signal generating technique, or the like, and can be achieved by using those known techniques as appropriate.

QAM signals can be obtained by performing the adjustment as described above.

A preferred embodiment of the QAM signal generating method is a QAM signal generating method using the quadrature amplitude modulation (QAM) signal generator comprising the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) which is provided on the second waveguide (5) and outputs a signal having smaller amplitude than the output signal from the first QPSK signal generator, wherein the first QPSK signal generator (3) and the second QPSK signal generator (6) comprise the main Mach-Zehnder waveguide (7a, 7b), and two sub Mach-Zehnder waveguides (8a, 9a, 8b, 9b), which are provided on the two arms of the main Mach-Zehnder waveguide (7a, 7b), and wherein the method includes a step of generating a first ASK signal as a quadruple amplitude-shift-keying (ASK) signal in the first main Mach-Zehnder waveguide (7a), a step of generating a second ASK signal as a quadruple amplitude-shift-keying (ASK) signal having a phase difference of 90° with respect to the first ASK signal in the second main Mach-Zehnder waveguide (7b), and a step of combining the first ASK signal with the second ASK signal.

A preferred example of this embodiment is a bias signal controlling method, wherein the main Mach-Zehnder waveguide (7a) of the first QPSK signal generator (3) and the main Mach-Zehnder waveguide (7b) of the second QPSK signal generator (6) comprise the first bias electrode (10a, 10b) and the second bias electrode (11a, 11b) for adjusting the bias voltage to be applied to the two arms constituting the main Mach-Zehnder waveguide, and the third bias electrode (13a, 13b) for applying the bias voltage to the two arms through which signals to be combined at the wave-combining part (12a, 12b) of the main Mach-Zehnder waveguide (7a, 7b), and wherein the bias signals to be applied to the first bias electrode (10a, 10b), the second bias electrode (11a, 11b), and the third bias electrode (13a, 13b) are controlled so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be 0° or 180°, and so that the first QPSK signal generator (3) and the second QPSK signal generator (6) allow the phase difference between the signals propagating through the first waveguide (2) and the second waveguide (5) before being combined with each other at the wave-combining point (4) to be 90° or 270°.

In this method, for example, two kinds of quadruple ASK signals (having four symbols of +1, +⅓, −⅓, and −1) are generated, and these two signals may be combined with each other by an outermost interferometer. In this regard, the bias voltage of the outermost interferometer may be adjusted so that these two signals have a phase difference of 90° or 270°.

Figure 3:
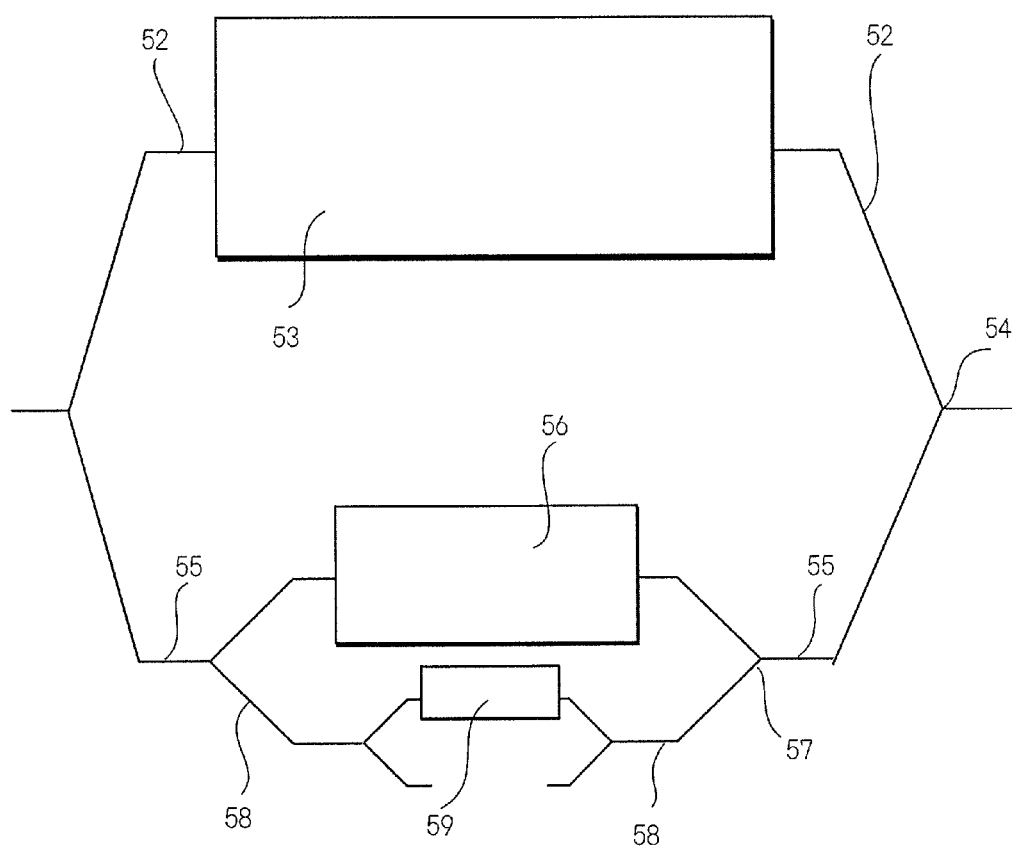
FIG. 3 is a schematic diagram showing a QAM signal generator using three QPSK signal generators arranged in parallel.

FIG. 3 is a schematic diagram showing a QAM signal generator using three QPSK signal generators arranged in parallel. As shown in FIG. 3, the QAM signal generator of this embodiment is a quadrature amplitude modulation (QAM) signal generator comprising a first waveguide (52), a first quadrature phase-shift keying (QPSK) signal generator (53) provided on the first waveguide (52), a second waveguide (55) being connected with the first waveguide (53) at an wave-combining point (54), a second QPSK signal generator (56) which is provided on the second waveguide (55) and outputs a signal having smaller amplitude than the output signal from the first QPSK signal generator, a third waveguide (58) being connected with the second waveguide (55) at an wave-combining point (57), and a third QPSK signal generator (59) which is provided on the third waveguide (58) and outputs a signal having smaller amplitude than the output signal from the second QPSK signal generator.

The above-described elements can be employed as appropriate for the elements of the QAM signal generator of this embodiment. In the above-described QAM signal generators, basically, two kinds of quadruple ASK signals are superimposed on each other, or two QPSK signals are superimposed on each other, thereby obtaining 16 QAM signals. Meanwhile, in the QAM signal generator shown in FIG. 3, basically, on the basis of the same principle as that described above, 64 QAM signals, which correspond to four times of 16 QAM signals, can be obtained. In other words, by superimposing the center of a square with the four symbols as its vertices on each white spot shown in FIG. 2, another QAM signals can be obtained.

When n parallel QPSK signal generators are used, where n is an integer of 2 or more, if the amplitude of the nth QPSK signal is half the amplitude of the (n−1)th QPSK signal, $2^{2n}$ QAM signals can be generated. In other words, two $2^n$ QAM signals are obtained, and they are then added with a phase difference of 90° or 270°. This can be achieved by adding n QPSK signals with a phase difference of 0°, 90°, 180°, or 270°. The amplitude of each QPSK signal is for example adjusted to be successively half, such as 1, ½, ¼, . . . 1/($2^n$). Each level of the $2^n$ ASK signals is $(2^n-1)/(2^n-1)$, $(2^{n-1}-2\times1)/(2^n-1)$, . . . $2*K)/(2n-1)$, . . . $(2^{n1}-2*(2n-1))/(2^n-1)$. Specifically, each level of an ASK signal when obtaining a 64 QAM signal is 1, 5/7, 3/7, 1/7, −1/7, −3/7, −5/7, and −1. Adjustment of the intensity ratio of each QPSK can be achieved using methods which are similar to those described above. Specifically, an attenuator or the like may be provided on an optical circuit to adjust the amplitude as appropriate. Alternatively, a diverging ratio may be adjusted when an input signal is allowed to diverge to each QPSK signal generator.

Automatic Bias Adjustment

When generating QPSK signals, a phase difference of 90° or 270° has to be maintained. This is the same as the condition for SSB modulation signal generation. Thus, a test sinusoidal signal with low frequency which does not have an influence on transmission (for example, several kHz or less) is input into a bias electrode, to which it is desirable to give a phase difference of 90°. When the SSB condition is fulfilled, only one of two sideband components is output. But when this condition is deviated from, both components are output, and these beats generate the double component of the modulation frequency. When such double component is controlled to be minimized, a phase difference of 90°, i.e. the required SSB condition can be obtained. The bias for the sub Mach-Zehnder waveguides can be set by inputting a sinusoidal signal, minimizing the same frequency component and maximizing the double component.

A specific embodiment is provided by any one of the quadrature amplitude modulation (QAM) signal generators described above comprising the first waveguide (2), the first quadrature phase-shift-keying (QPSK) signal generator (3) provided in the first waveguide (2), the second waveguide (5) being connected with the first waveguide (2) at the wave-combining point (4), and the second QPSK signal generator (6) which is provided on the second waveguide (5) and outputs a signal having smaller amplitude than the output signal from the first QPSK signal generator, wherein the first QPSK signal generator (3) and the second QPSK signal generator (6) comprise the main Mach-Zehnder waveguide (7a, 7b), the two sub Mach-Zehnder waveguides (8a, 9a, 8b, 9b) which are provided on the two arms of the Mach-Zehnder waveguide (7a, 7b), the test signal inputting device for inputting a test signal to each bias electrode, the optical detector for detecting an output signal from a waveguide to which a test signal has been input by the test signal inputting device, and the automatic bias adjusting device for (using detection data from the optical detector) adjusting the bias voltage so that the double component of the modulation frequency minimizes when an output spectrum detected by the optical detector includes two sideband components. By doing so, adjustment for an optimum bias condition can be achieved automatically.

The QAM signal generator of this embodiment relates to any one of the devices described above, wherein the frequency of the test signal is 10 kHz or less. Since a signal with a frequency of 10 kHz does not have an influence on transmission, automatic bias adjustment can be achieved while performing information communications.

A specific embodiment is a bias adjusting method for supplying a predetermined signal to the main Mach-Zehnder waveguide and adjusting the bias signals to be supplied to the first sub Mach-Zehnder waveguide and the second sub Mach-Zehnder waveguide so that the amplitude of the output light of the main Mach-Zehnder waveguide is reduced, wherein the predetermined signal to be supplied to the main Mach-Zehnder waveguide is an AC signal having amplitude which is the same as the half-wavelength voltage, which is the voltage required to change the phase difference of an optical signal by 180°, or is higher than it.

The QAM signal generator of the present invention preferably comprises a controller which is connected to a detector and a signal source for applying a bias signal at each bias electrode. The controller supplies, based on the information about the output light detected by the detector, information about the bias voltage to the signal source. By providing this controller with a QAM signal generator, automatic bias adjustment can be performed automatically.

Another preferred embodiment of the present invention relates to a signal generating system comprising a plurality of signal generators arranged in parallel and an wave-combining part at which the outputs from the signal generators are combined with each other, wherein the signal generator comprises the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) which is provided on the second waveguide (5) and outputs a signal to be combined with the output signal from the first QPSK signal generator.

In other words, by combining the outputs from the above-described signal generators with each other, more varied optical signals can be obtained. An example of the "signal to be combined with the output signal from the first QPSK signal generator" is, a signal having amplitude which is half the amplitude of the output signal from the first QPSK signal generator. The signal generating system preferably allows a signal to be transmitted from an input part via a plurality of diverging parts to each signal generator. The signal generating system can employ the configurations of the above-described signal generators as appropriate.

Another preferred embodiment of the present invention is a signal generator comprising the first waveguide (52), the first quadrature phase-shift keying (QPSK) signal generator (53) provided on the first waveguide (52), the second waveguide (55) being connected with the first waveguide (53) at the wave-combining point (54), the second QPSK signal generator (56) which is provided on the second waveguide (55) and outputs a signal to be combined with an output signal from the first QPSK signal generator, the third waveguide (58) being connected with the second waveguide (55) at the wave-combining point (57), the third QPSK signal generator (59) which is provided on the third waveguide (58) and outputs a signal to be combined with the output signal from the second QPSK signal generator, and the "nth waveguide being connected with the (n−1)th waveguide at an wave-combining point and the nth QPSK signal generator for outputting a signal to be combined with the output signal from the (n−1)th QPSK signal generator" with respect to all combinations in between four and n, where n is an integer of four or more.

As shown in FIG. 3, by providing many divergences, signals with varied output can be obtained, and in addition, by providing smaller QPSK signal generators, more varied signals can be obtained. By combining the outputs from the signal generators, much more varied optical signals can be obtained. An example of the "signal to be combined with the output signal from the first QPSK signal generator" is a signal having amplitude which is half the amplitude of the output signal from the first QPSK signal generator. This signal generating system preferably allows a signal to be transmitted from one input part via a plurality of diverging parts to each signal generator. The configurations of the above-described signal generators can be employed as appropriate for this signal generator.

Another preferred embodiment of the present invention relates to a signal generator comprising the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) which is provided on the second waveguide (5) and outputs a signal to be combined with the output signal from the first QPSK signal generator.

When the "signal to be combined with the output signal from the first QPSK signal generator" is set to be a signal having amplitude which is half the amplitude of the output signal from the first QPSK signal generator, the above-described QAM signal generator can be provided. Meanwhile, for example, even when the output from the first QPSK signal generator is set to be the same as the output from the second QPSK signal generator, by superimposing these signals on each other, varied modulation signals can be provided. This signal generating system preferably allows a signal to be transmitted from one input part via a plurality of diverging parts to each signal generator. The configurations of the above-described signal generators can be employed as appropriate for this signal generating system.

Another preferred embodiment of the present invention relates to a signal generator comprising the first waveguide (52), the first quadrature phase-shift keying (QPSK) signal generator (53) provided on the first waveguide (52), the second waveguide (55) being connected with the first waveguide (53) at the wave-combining point (54), the second QPSK signal generator (56) which is provided on the second waveguide (55) and outputs a signal to be combined with the output signal from the first QPSK signal generator, the third waveguide (58) being connected with the second waveguide (55) at the wave-combining point (57), and the third QPSK signal generator (59) which is provided on the third waveguide (58) and outputs a signal to be combined with the output signal from the second QPSK signal generator.

When the "signal to be combined with the output signal from the first QPSK signal generator" is set to be a signal having amplitude which is half the amplitude of the output signal from the first QPSK signal generator, the above-described QAM signal generator can be provided. Meanwhile, for example, even when the output from the first QPSK signal generator is set to be the same as the output from the second QPSK signal generator, by superimposing these signals on each other varied modulation signals can be provided. This signal generating system preferably allows a signal to be transmitted from one input part via a plurality of diverging parts to each signal generator. The configurations of the above-described signal generators can be employed as appropriate for this signal generating system.

Another embodiment of the present invention, but which is different from the above-described embodiments, is a QAM signal generating method using a quadrature amplitude modulation (QAM) signal generator comprising the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) which is provided on the second waveguide (5) and outputs a signal having smaller amplitude than the output signal from the first QPSK signal generator, wherein the first QPSK signal generator (3) and the second QPSK signal generator (6) comprise the main Mach-Zehnder waveguide (7a, 7b), and two sub Mach-Zehnder waveguides (8a, 9a, 8b, 9b), which are provided on the two arms of the main Mach-Zehnder waveguide (7a, 7b), wherein the main Mach-Zehnder waveguide (7a) of the first QPSK signal generator (3) and the main Mach-Zehnder waveguide (7b) of the second QPSK signal generator (6) comprise at least one of the first bias electrode (10a, 10b) for adjusting the bias voltage to be applied to the first arm of the main Mach-Zehnder waveguide, the second bias electrode (11a, 11b) for adjusting the bias voltage to be applied to the second arm of the main Mach-Zehnder waveguide, and the third bias electrode (13a, 13b) for applying a bias voltage to the two arms through which signals which are combined at the wave-combining part (12a, 12b) of the main Mach-Zehnder waveguide (7a, 7b), wherein the bias signals to be applied to the bias electrodes are controlled so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be 90° or 270°, and so that the first QPSK signal generator (3) and the second QPSK signal generator (6) allow the phase difference between the signals propagating through the first waveguide (2) and the second waveguide (5) before being connected with each other at the wave-combining point (4) to be 0° or 180°, and combines the output signal from the first QPSK signal generator with the output signal from the second QPSK signal generator (6), of which the amplitude is half that of the output signal from the first QPSK signal generator.

In this QAM signal generating method, while the so-called nested Mach-Zehnder waveguides are used, the bias electrodes may be provided on any Mach-Zehnder waveguides. Such a bias electrode adjusting method can by achieved by using the waveguides in the optical SSB modulator or optical FSK signal generator as appropriate.

A preferred QAM signal generating method is a QAM signal generating method using a quadrature amplitude modulation (QAM) signal generator comprising the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) which is provided on the second waveguide (5) and outputs a signal having smaller amplitude than the output signal from the first QPSK signal generator, wherein the first QPSK signal generator (3) and the second QPSK signal generator (6) comprise the main Mach-Zehnder waveguide (7a, 7b), and two sub Mach-Zehnder waveguides (8a, 9a, 8b, 9b), which are provided on the two arms of the main Mach-Zehnder waveguide (7a, 7b), wherein the main Mach-Zehnder waveguide (7a) of the first QPSK signal generator (3) and the main Mach-Zehnder waveguide (7b) of the second QPSK signal generator (6) comprise at least one of the first bias electrode (10a, 10b) for adjusting the bias voltage to be applied to the first arm of the main Mach-Zehnder waveguide, the second bias electrode (11a, 11b) for adjusting the bias voltage to be applied to the second arm of the main Mach-Zehnder waveguide, and the third bias electrode (13a, 13b) for applying a bias voltage to the two arms through which signals to be combined at the wave-combining part (12a, 12b) of the main Mach-Zehnder waveguide (7a, 7b). The QAM signal generating method includes a step of controlling the bias signals to be applied to the first bias electrode (10a, 10b), the second bias electrode (11a, 11b), and the third bias electrode (13a, 13b) so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be (45+ 90m)°, where m is an integer, and so that the first QPSK signal generator (3) and the second QPSK signal generator (6) allow the phase difference between the signals propagating through the first waveguide (2) and the second waveguide (5) before being combined with each other at the wave-combining point (4) to be 0° or 180°, and a step of combining the output signal from the first QPSK signal generator with the output signal from the second QPSK signal generator (6). In this QAM signal generating method, the configurations of the above-described QAM signal generators can be employed as appropriate.

This QAM signal generating method is preferably a QAM signal generating method using a quadrature amplitude modulation (QAM) signal generator comprising the first waveguide (2), the first quadrature phase-shift-keying (QPSK) signal generator (3) provided on the first waveguide (2), the second waveguide (5) being connected with the first waveguide (2) at the wave-combining point (4), and the second QPSK signal generator (6) provided on the second waveguide (5), wherein the first QPSK signal generator (3) and the second QPSK signal generator (6) comprise the main Mach-Zehnder waveguide (7a, 7b), and the two sub Mach-Zehnder waveguides (8a, 9a, 8b, 9b), which are provided on the two arms of the main Mach-Zehnder waveguide (7a, 7b), wherein the main Mach-Zehnder waveguide (7a) of the first QPSK signal generator (3) and the main Mach-Zehnder waveguide (7b) of the second QPSK signal generator (6) comprise at least one of the first bias electrode (10a, 10b) for adjusting the bias voltage to be applied to the first arm of the main Mach-Zehnder waveguide, the second bias electrode (11a, 11b) for adjusting the bias voltage to be applied to the second arm of the main Mach-Zehnder waveguide, and the third bias electrode (13a, 13b) for applying a bias voltage to two arms through which signals to be combined at the wave-combining part (12a, 12b) of the main Mach-Zehnder waveguide (7a, 7b). The QAM signal generating method includes a step of controlling the bias signals to be applied to the first bias electrode (10a, 10b), the second bias electrode (11a, 11b), and the third bias electrode (13a, 13b), so that the four sub Mach-Zehnder waveguides (8a, 9a, 8b, 9b) allow the phase difference between the signals propagating through the two arms before being combined with each other to be 180°, so that the main Mach-Zehnder waveguide (7a, 7b) allows the phase difference between the signals propagating through the two arms before being combined with each other to be (30+90l)°, where l is an integer, and so that the first QPSK signal generator (3) and the second QPSK signal generator (6) allow the phase difference between the signals propagating through the first waveguide (2) and the second waveguide (5) before being combined with each other at the wave-combining point (4) to be 0° or 180°, and a step of combining the output signal from the first QPSK signal generator and the output signal from the second QPSK signal generator (6) with each other.

Another preferred embodiment of the present invention is a QPSK signal generator comprising the main Mach-Zehnder waveguide (7a, 7b), two sub Mach-Zehnder waveguides (8a, 9a, 8b, 9b) which are provided on the two arms of the main Mach-Zehnder waveguide (7a, 7b), a test signal inputting device for inputting a test signal to the bias electrode of one of the main Mach-Zehnder waveguides, or one or both of the bias electrodes of the two sub Mach-Zehnder waveguides, an optical detector for detecting an output signal from a waveguide to which the test signal has been input from the test signal inputting device, and an automatic bias adjusting device which uses detection data from the optical detector and adjusts the bias voltage so that when an output spectrum detected by the optical detector includes two sideband components, the double component of the modulation frequency is reduced. In this QPSK signal generator, the configurations of the above-described QAM signal generators can be employed as appropriate. In order to adjust the bias voltage to reduce the double component of the modulation frequency by the automatic bias adjusting device, the detection data from the optical detector may be monitored, while the bias voltage is increased or decreased.

This QPSK signal generator is preferably any one of the above-described devices in which the frequency of test signal is 10 kHz or less.

This QPSK signal generator is also preferably any one of the above-described devices in which the test signals are input to both the two sub Mach-Zehnder waveguides and the two test signals have a phase difference of 90° or 270°.

First Example

16 QAM Mapping Using Two QPMZMs

Figure 4:
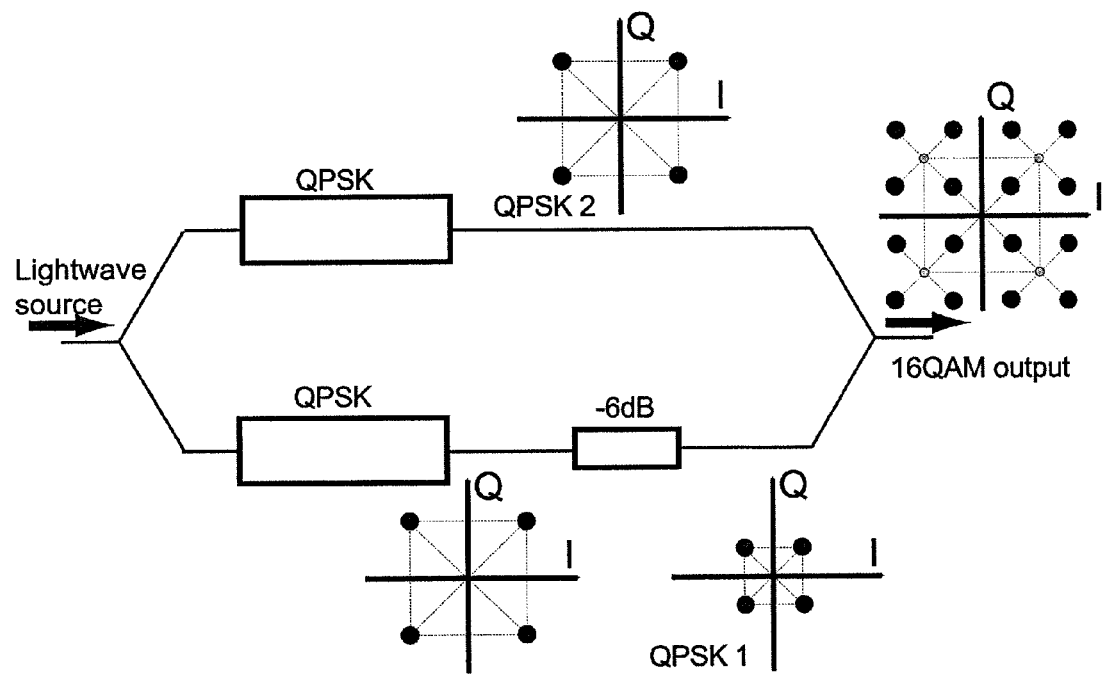
FIG. 4 is a diagram illustrating the principle of a 16 QAM modulator of the present invention.

FIG. 4 shows a diagram illustrating the principle of a 16 QAM modulator of the present invention. In this example, two kinds of QPSK signals having different amplitudes (intensity) are superimposed on each other in order to obtain 16 QAM signals. The intensity difference between the two QPSK signals was set to be 6 dB. The QPSK signal having larger amplitude (which is shown by QPSK2 in FIG. 4) determines the area in which a quadrant is mapped. Meanwhile, the QPSK signal having smaller amplitude (which is shown by QPSK1 in FIG. 4) fixes the position of each quadrant. By combining two QPSK signals with each other, 16 equally-spaced symbols can be mapped in a phase diagram. This 16 QAM mapping can be obtained using binary data without using multilevel electrical signals.

Second Example

QPMZM for 16 QAM

Figure 5:
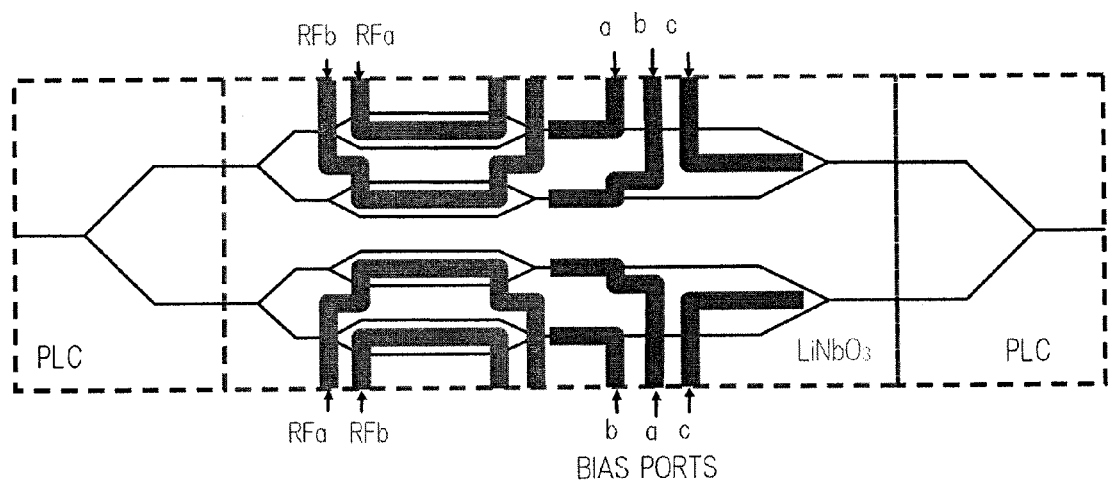
FIG. 5 is a schematic diagram of a device detailed in the second example.

As shown in FIG. 5, in the present example, using the optically connected LiNbO$_3$ waveguides and silicon-based PLC (planar lightwave circuit), a modulator comprising a QPMZM (quadruplex parallel MZMs) for 16 QAM modulation was manufactured. This QPMZM was manufactured by arranging four MZMs (MZM-I, MAM-Q, MZM-i, and MZM-q) in parallel. In other words, this QPMZM was provided with two DPMZMs (dual parallel MZMs). Each MZM was provided with traveling-wave-type electrodes (RFa1, RFb1, RFa2, and RFb2). As shown in FIG. 5, the QPMZM was further provided with six bias electrodes for controlling the phase offset between the MZMs. The input and output of the two DPMZMs were coupled to PLC-based optical couplers at their ends.

Figure 6:
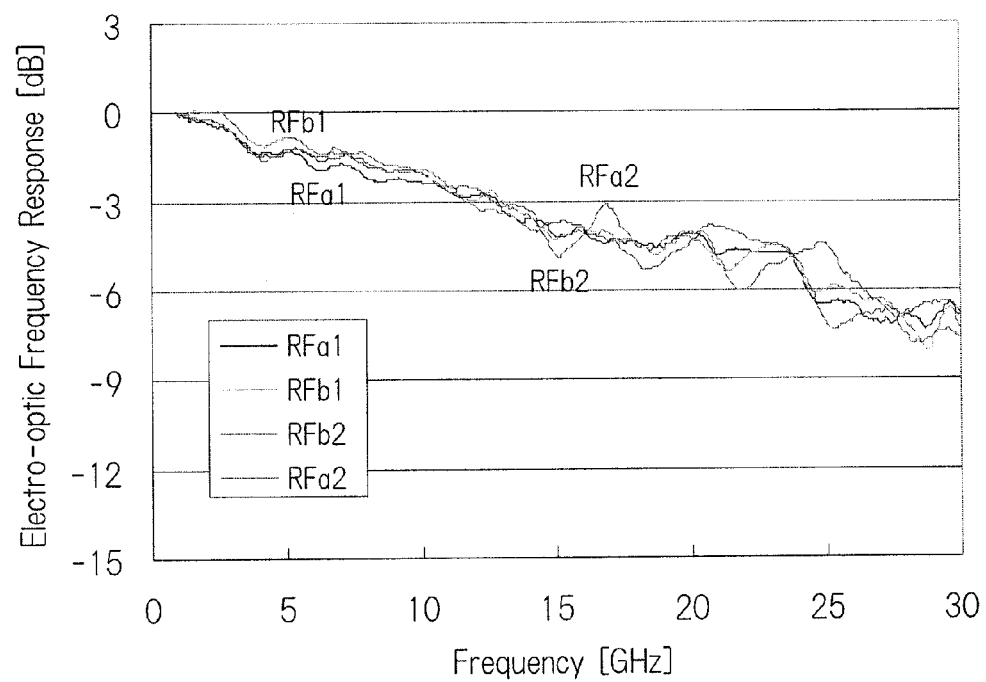
FIG. 6 is a graph showing an electro-optic frequency response in each electrode detailed in the second embodiment.

The electro-optic frequency response in each electrode is shown in FIG. 6. In FIG. 6, the modulation electrodes of the bandwidths of 3 dB and 6 dB were approximately 10 GHz and 25 GHz. In other words, it was found that this modulator can be used for high-speed modulation up to 25 Gbaud. The halfwave voltage of each MZM was 2.9 V for DC voltage and 4.2 V for 10 GHz. The fiber-to-fiber insertion loss of the modulator used in the present embodiment was 10 dB.

Third Example

Modulator for 50-Gb/s 16 QAM Modulation

Figure 7:
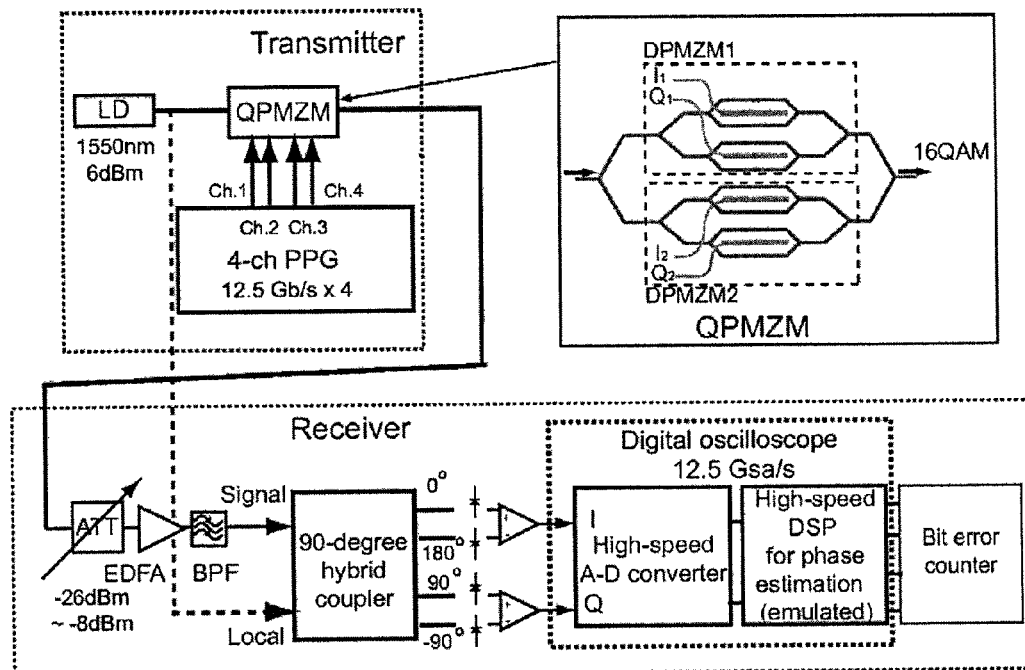
FIG. 7 is a schematic diagram showing the configuration of the device used in the third example.

FIG. 7 is a schematic diagram showing the configuration of the device used in the present example. Within a transmitter, the continuous light from an external cavity semiconductor laser diode (LD) was subjected to 16 QAM modulations by a QPMZM. Each arm of a modulator was push-pull-driven using the PRBS (pseudo random bit sequence) of 12.5 Gb/s binary NRZ (non-return-to-zero) with a data length of $2^9-1$ generated by a commercial 4-channel pulse pattern generator (PPG). A pair of MZMs (MZM-I and MZM-Q) was driven within a range between $-\pi$ to $\pi$ in order to obtain large-amplitude QPSK signals. The remaining pair of MZMs was driven within a range of $-\pi/2$ to $\pi/2$ in order to obtain small-amplitude QPSK signals.

Within a receiver, a signal was demodulated using a digital homodyne wave detector. The digital homodyne wave detector combined a signal with local oscillator (LO) light using an optical hybrid coupler. For simplicity, the LO light was common light from the semiconductor laser diode for generating light for the signal. A phase offset of 90° was provided between the four output ports by the hybrid coupler. By differential detection of pairs [0°, 180°] and [−90°, 90°], the I components (in-phase components) and Q components (quadrature phase components) on the basis of the phase of the LO light were restored. The detected optical signal was input to a high-speed AD converter. The phase difference between the signal and LO light was calculated using a digital signal processor (DSP) tuned for QAM signals. The I components and Q components were thus restored.

Figure 8:
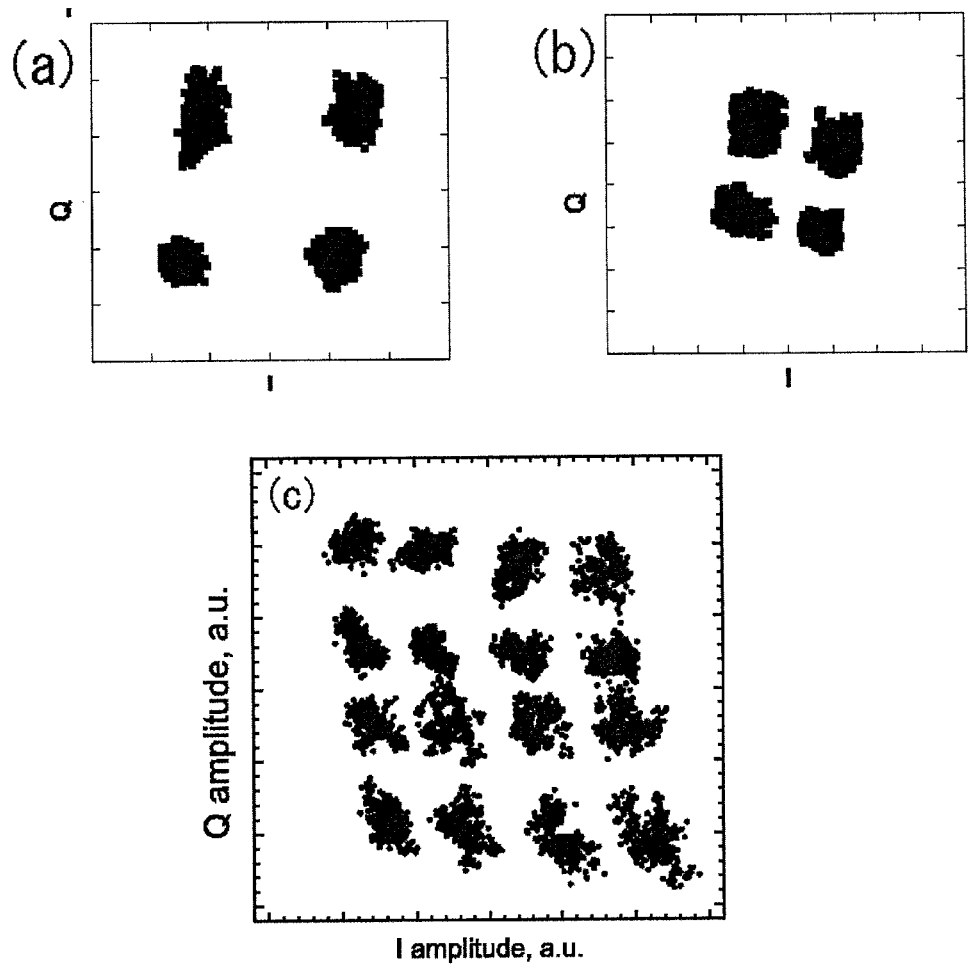
FIG. 8(a) is a constellation map obtained by driving a MZM-I and a MZM-Q.
FIG. 8(b) is a constellation map obtained by driving a MZM-i and a MZM-q.
FIG. 8(c) is an IQ map obtained by driving all MZMs.

FIG. 8(*a*) is a constellation map obtained by driving the MZM-I and the MZM-Q. FIG. 8(*b*) is a constellation map obtained by driving the MZM-i and the MZM-q. FIG. 8(*a*) and FIG. 8(*b*) show that large-amplitude and small-amplitude QPSK signals have been generated, respectively. FIG. 8(*c*) is an IQ map obtained by driving all the MZMs. As seen from FIG. 8(*c*), an optical 16 QAM signal has been generated.

The received I components and Q components are multi-level signals. The multilevel signals were decoded by an appropriate threshold technique which absorbs I-Q axial distribution. Compared to original data, the BER (bit error rate) was considered to be $2\times10^{-3}$, achieving the same level as the FEC (Forward Error Correction) limit.

Figure 9:
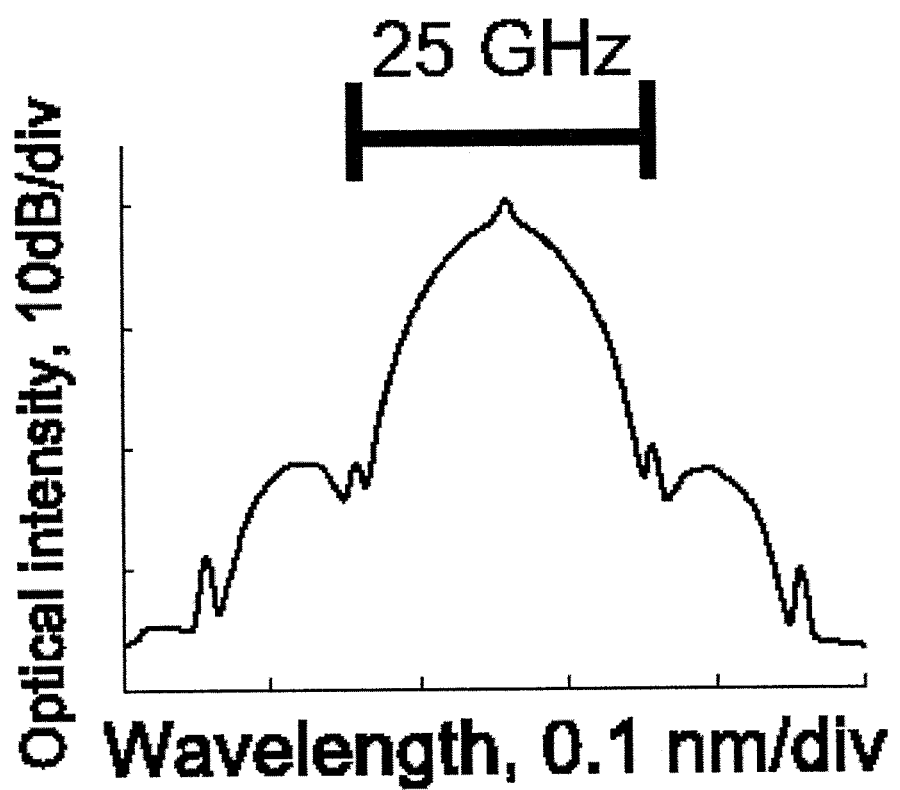
FIG. 9 a graph showing a modulation spectrum obtained by the third example.

The modulation spectrum shown in FIG. 9 shows that the occupation band of the 16 QAM is the same as the band of the DPSK and DQPSK. It has therefore been demonstrated that a 50 Gb/s signal can be accommodated within a conventional WDM channel of 12.5 Gb/s. Of course, in order to achieve a 100 Gb/s transfer, by using polarization multiplexing jointly, two channels can be multiplexed. In addition, the frequency response of the QPMZM was at a sufficient level to achieve 25 Gbaud, and it was equivalent to a 100 Gb/s 16 QAM.

As described above, the QPMZM of the present embodiment can perform 16 QAM modulations by superimposing two QPSK on each other. The present example demonstrates that 50 Gb/s 16 QAM modulation has been achieved.

The present invention can provide a quadrature amplitude modulation signal generator and can be favorably used in the field of optical information communications.

What is claimed is:

1. A quadrature amplitude modulation (QAM) signal generating method
the method comprising:
combining an output signal from a first QPSK signal generator and an output signal from a second QPSK signal generator, wherein the output signal from the second QPSK signal generator is a half of an amplitude of the output signal from the first QPSK signal generator, wherein each of a main Mach-Zehnder waveguide of the first QPSK signal generator and a main Mach-Zehnder waveguide of the second QPSK signal generator has a first bias electrode, a second bias electrode, and a third bias electrode, wherein the first bias electrode adjusts a bias voltage applied to a first arm of the main Mach-Zehnder waveguide, wherein the second bias electrode adjusts a bias voltage applied to a second arm of the main Mach-Zehnder waveguide, wherein the third bias electrode applies a bias voltage to signals that go though the first arm and the second arm of the main Mach-Zehnder waveguide and are combined at an wave-combining part of the main Mach-Zehnder waveguide; and
controlling bias signals applied to the first bias electrode, the second bias electrode, and the third bias electrode, so that four sub Mach-Zehnder waveguides allow a phase difference of signals propagating through the first arm and the second arm before being combined with each other to be 0° or 180°, so that the main Mach-Zehnder waveguide allows a phase difference between signals propagating through the first arm and the second arm before being combined with each other to be 90° or 270°, and so that the first QPSK signal generator and the second QPSK signal generator allow a phase difference between signals propagating through the first waveguide and the second waveguide before being connected with each other at the wave-combining point to be 0° or 180°.

2. A quadrature amplitude modulation (QAM) signal generating method
the method comprising:
generating a first amplitude-shift-keying (ASK) signal which is a quadruple ASK signal at a first main Mach-Zehnder waveguide;
generating a second amplitude-shift-keying (ASK) signal which is a quadruple ASK signal in a second main Mach-Zehnder waveguide, the second ASK signal having a phase difference of 90° with respect to the first ASK signal; and
combining the first ASK signal and the second ASK signal.

3. The QAM signal generating method as claimed in claim 2,
wherein the amplitude of the output signal from the second QPSK signal generator is smaller than the amplitude of the output signal from the first QPSK signal generator.

4. The QAM signal generating method as claimed in claim 2,
wherein each of the main Mach-Zehnder waveguide of the first QPSK signal generator and the main Mach-Zehnder waveguide of the second QPSK signal generator has a first bias electrode, a second bias electrode, and a third bias electrode, wherein the first bias electrode adjusts a bias voltage applied to a first arm of the main Mach-Zehnder waveguide;

wherein the second bias electrode adjusts a bias voltage applied to a second arm of the main Mach-Zehnder waveguide;

wherein the third bias electrode applies a bias voltage to the signals that go though the first arm and the second arm of the main Mach-Zehnder waveguide and are combined at an wave-combining part of the main Mach-Zehnder waveguide, the method further comprising:

controlling bias signals to be applied to the first bias electrode, the second bias electrode, and the third bias electrode, so that four sub Mach-Zehnder waveguides allow a phase difference between signals propagating through the first arm and the second arm before being combined to be 180°, so that the main Mach-Zehnder waveguide allows a phase difference between signals propagating through the first arm and the second arm before being combined with each other to be 0° or 180°, and so that the first QPSK signal generator and the second QPSK signal generator allow a phase difference between signals propagating through the first waveguide and the second waveguide before being connected with each other at the wave-combining point to be 90° or 270°.

* * * * *